E. A. OVENSHIRE.
INFORMATION AND DIRECTORY CABINET.
APPLICATION FILED MAR. 31, 1908.
958,673.
Patented May 17, 1910.
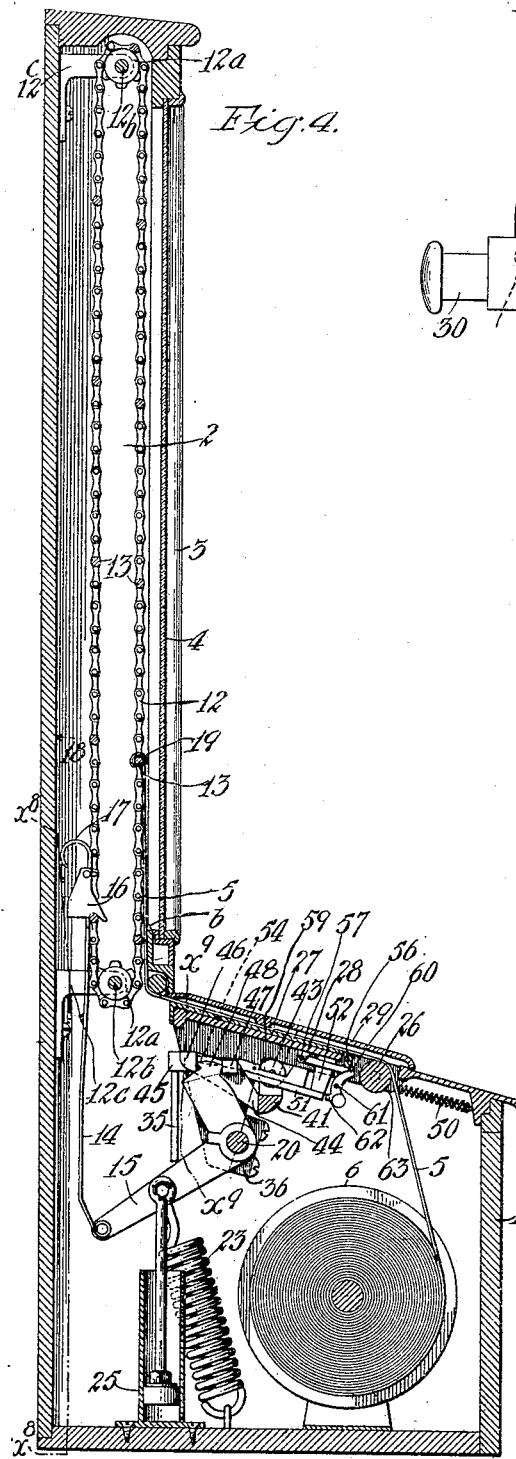

E. A. OVENSHIRE.
INFORMATION AND DIRECTORY CABINET.
APPLICATION FILED MAR. 31, 1908.
958,673.
Patented May 17, 1910.
3 SHEETS—SHEET 1.
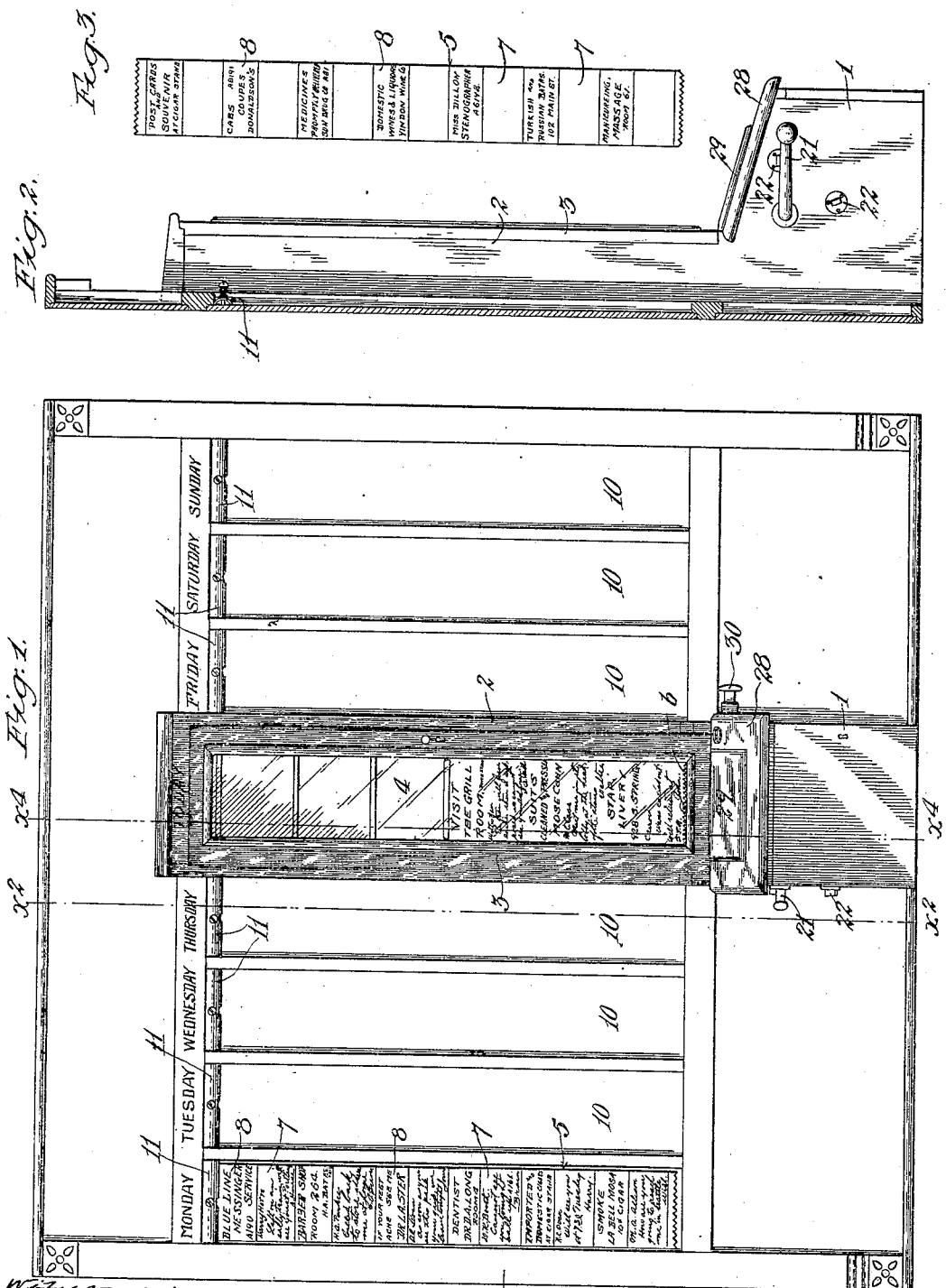

E. A. OVENSHIRE.
INFORMATION AND DIRECTORY CABINET.
APPLICATION FILED MAR. 31, 1908.
958,673.
Patented May 17, 1910.
3 SHEETS—SHEET 3.
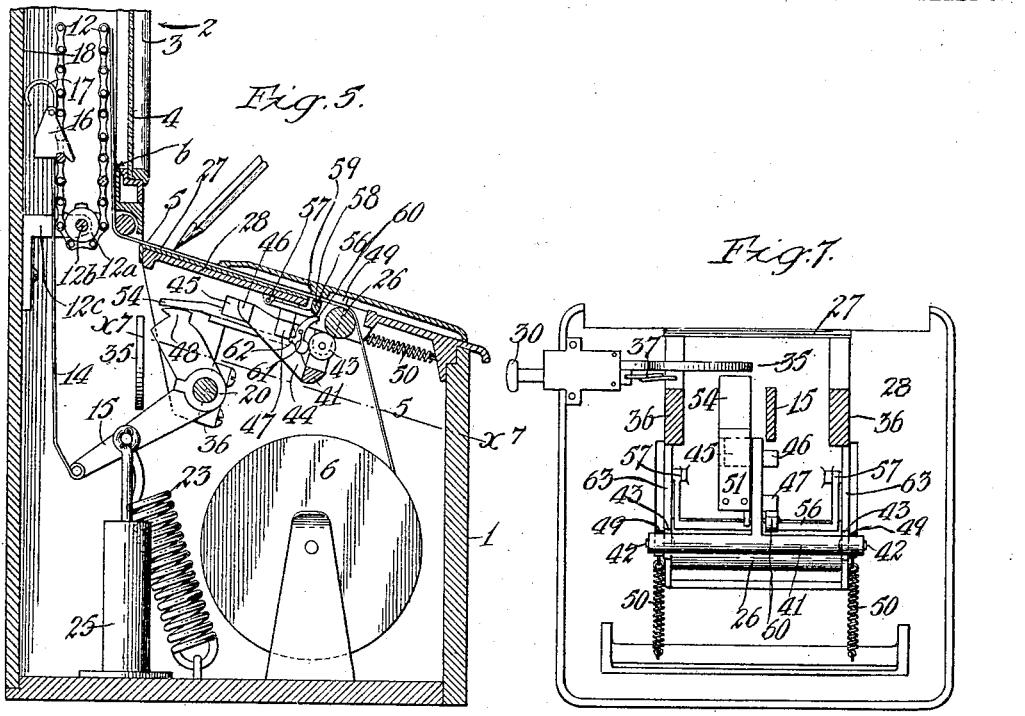
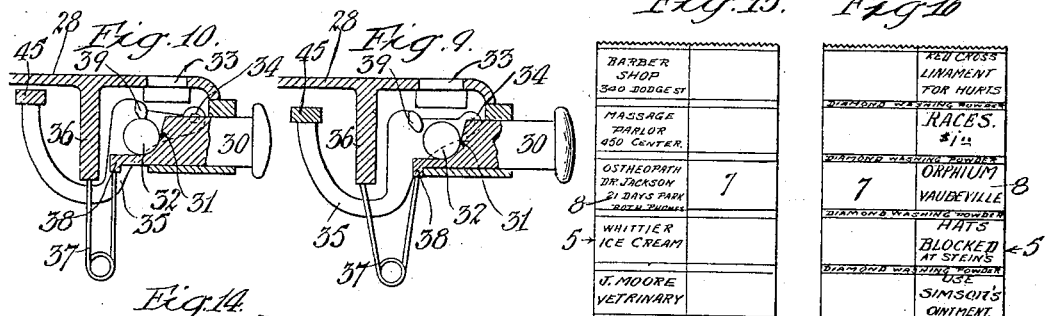
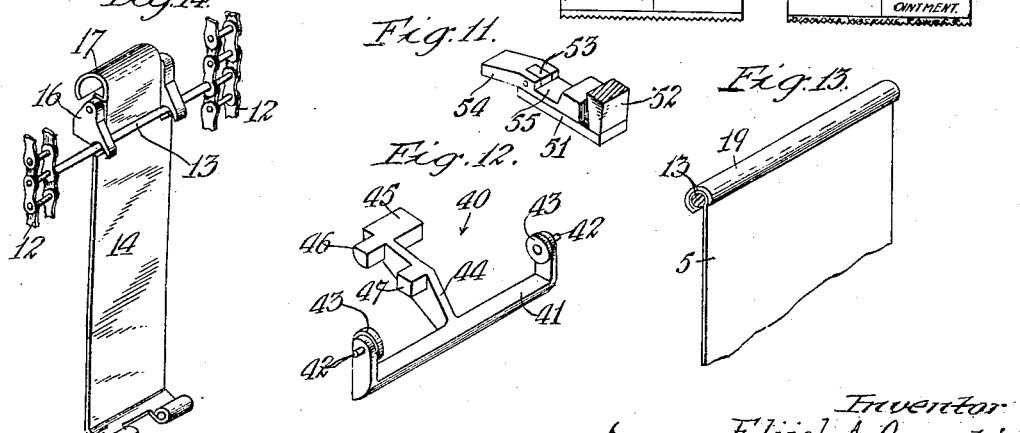
Inventor
Elijah A. Ovenshire
Witnesses:

UNITED STATES PATENT OFFICE.

ELIJAH A. OVENSHIRE, OF LOS ANGELES, CALIFORNIA.

INFORMATION AND DIRECTORY CABINET.

958,673. Specification of Letters Patent. Patented May 17, 1910.

Application filed March 31, 1908. Serial No. 424,461.

*To all whom it may concern:*

Be it known that I, ELIJAH A. OVENSHIRE, a citizen of the United States, residing at Los Angeles, in the county of Los Angeles and State of California, have invented a new and useful Information and Directory Cabinet, of which the following is a specification.

This invention relates to an information and filing cabinet and the object of the invention is to provide a device of that nature which may be located in railroad stations, hotels, banks, cafés, etc., for the purpose of enabling messages to be left in a prominent place by parties who have appointments to meet in that locality and who have failed to meet at the appointed time for some unknown reason, thus a message may be left by the party who called to notify the other party of another appointment.

The messages are written on a strip of paper, which strip, besides containing spaces upon which the messages are to be written, contains a directory or other advertising which will be useful to the parties making use of the device. The messages so written are left prominently in public view for one day after which they are transferred to another part of the device and kept in public view for a week, each strip of messages being in a definite position for each day in the week.

During the day on which messages are written they are exhibited in a transparent receiver, and the remainder of the strip upon which messages are to be written is not accessible. A party who wishes to write a message on the strip must deposit a coin in the device. The deposit of such coin enables the party to have access to a blank space of the strip on which to write his message, after which the machine is operated to advance the strip and bring the message under the transparent receiver and cover the remainder of the strip.

The directory portion of the strip is so arranged that the blank spaces adapted to receive the messages, alternate with the printed directory or advertising information, and the printed part of the strip thus serves to separate the several individual messages from each other, in addition to conveying information useful to the patrons of the device.

The accompanying drawings illustrate the invention, and referring thereto:—Figure 1 is a front elevation of the invention. Fig. 2 is a vertical section on line $x^2$—$x^2$ Fig. 1. Fig. 3 is a face view of a detached directory strip. Fig. 4 is an enlarged vertical section on line $x^4$—$x^4$ Fig. 1, showing the parts in normal position. Fig. 5 is a view similar to Fig. 4 of the lower portion thereof only, showing the parts in second position with the slide open. Fig. 6 is a view similar to Fig. 5, showing the parts in the next position. Fig. 7 is a view, in section, on line $x^7$—$x^7$ Fig. 5, looking upward at the mechanism from the underside thereof. Fig. 8 is a section on line $x^8$—$x^8$ Fig. 4. Fig. 9 is an enlarged section on line $x^9$—$x^9$ Fig. 4, showing the parts in normal position with a coin in position. Fig. 10 is a view similar to Fig. 9, showing the parts after having been operated the first step. Fig. 11 is a perspective view of the rock plate. Fig. 12 is a perspective view of the locking device. Fig. 13 is a perspective view showing the manner of fastening the directory strip to the carrier chains. Fig. 14 is a perspective of a portion of the carrier chains and the actuating device therefor. Fig. 15 is a view of another form of strip. Fig. 16 is a view of another form of strip.

The device comprises a box 1 within which the operating machinery is housed. Extending upward at the rear of the box 1 is a display box 2 having a hinged door 3 with a glass panel 4. A directory strip 5 is supplied from a reel 6 located within box 1, and as the machine is operated the directory strip 5 is caused to be propelled step by step from the box 1 into the display box 2 and presented to the public view behind the glass panel 4. The directory strip, as shown in Fig. 3, is provided with alternate blank spaces 7 upon which messages are to be written, as will be described, and the strip is also provided with alternating printed directory information 8. The printed portions 8 serve to impart valuable information to patrons of the device, and also serve to separate the message portions 7 so that the individual messages stand out clear and distinct from each other.

After the directory strip has been moved far enough to completely fill the transparent display box 2, that portion of the directory strip which is within the display box is severed from the remainder of the strip and is hung on a display board 9, the latter extending on both sides of the display box 2 and being divided into seven panels 10, there being one panel for each day in the week, and each panel is of a size sufficient to receive strips containing the messages for a single day's business. The strips are held in the respective panels by means of spring clips 11 which are provided at the top of the panels. It may be that a single day's business will fill several strips, all of which would be hung in the panel corresponding to the day they were prepared. For example, strips upon which the messages had been written on Sunday would on Monday, all be hung in the Sunday panel, or strips which had been written on Wednesday would on Thursday be hung in the Wednesday panel. If a strip became filled up before the end of the day's business it may be severed and hung in the panel for that day. Obviously there might not be enough messages on one day to completely fill a strip section, in which event only so much of the strip as contains the messages for that day will be severed from the strip and hung in the panel for it.

The directory strip is moved along by an endless carrier comprising two chains 12 which are united at intervals by cross rods 13, as clearly shown in Fig. 14. These chains travel over sprockets 12$^a$ which are mounted on shafts 12$^b$ journaled in brackets 12$^c$ at the upper and lower ends of the display box 2. The carrier is advanced step by step by means of a reciprocating strap 14, the lower end of which is pivoted to a bell crank lever 15, the upper end of strap 14 having pivoted thereto a dog 16 which is adapted to engage with the cross rods 13 as clearly shown in Fig. 14. The strap 14 has a curved end portion 17 which acts as a shoe to ride along the back wall 18 of the display box 2, the shoe 17 acting to hold the strap close to the chain. As the strap 14 is moved up, the inclined face of the dog 16 strikes the underside of a cross rod 13 and the dog is thus caused to tilt its lower end rearwardly, as the strap 14 rises, until the dog comes above the rod 13, whereupon the dog swings over the top of the cross bar 13, so that during the succeeding downward movement of the strap 14 the carrier is advanced.

The directory strip 5 is detachably attached to one of the rods 13 by means of a longitudinally split tube 19. As shown in Fig. 13, the end of the strip is bent around the cross rod 13 and clamped thereon by the split tube 19, the latter being curved to embrace a trifle more than a half a circle. This method of fastening enables the strip to be quickly attached to or detached from the carrier.

A blade $b$ having a serrated edge is arranged at the lower end of the display box, so that by opening the door of the display box and detaching the end of the strip from the carrier, the strip may readily be severed on the edge of the blade $b$, and then hung in the panel for it on the display board.

The bell crank lever 15, which actuates the carrier, is mounted on a shaft 20, one end of which extends through the left hand side of the box 1 and is provided with a crank 21, the throw of which is limited by two stops 22 as shown in Fig. 2. The bell crank lever 15 is normally locked against movement by mechanism which will be described. A coil spring 23 serves to restore the bell crank lever 15, and a dash-pot and plunger 25 cushion its downward stroke. The strip after it leaves the reel 6 runs over a roller 26 and then passes over the top of a flat platen 27 arranged on a stationary plate 28, that latter forming the top of the box 1. A slide 29 is arranged to slide over the platen 27 to normally cover the strip, but when the controlling mechanism has been released by the insertion of a coin into the mechanism, as will be described, the slide 29 slides into the position shown in Fig. 5 to expose a blank portion 7 of the directory strip so that the patron may write his message on the blank space. While the slide is thus open only a blank space is presented to view, and after the message has been written, and the machine restored by the crank, the carrier operates a distance equal to twice the closing movement of the slide 29, so that the message which has been written, together with the advertising section 8, which is immediately above the message, are carried up into the display box and both are presented to the view. This coöperation and ratio of movement between slide 29 and the directory strip is an important feature, as by this means, when the slide is open, the person who writes the message is prevented from scribbling or marring the adjacent advertising or directory portion of the strip, yet he is allowed the privilege of writing what he desires on the blank space which is accessible to him, and as the printed portions of the directory strip are spaced alternately a new printed card or section of advertising appears, together with the last written message, at the completion of each operation of the machine.

The mechanism which controls the operation of the machine comprises a push bar 30 which projects through a slot in the right hand side of the machine and which as shown in Fig. 9, is provided with a recess 31 to receive a coin 32, the latter being inserted through a slot 33 in the top plate of the box 1. Pivoted at 34 and close to the push bar 30 is a coin lever 35 which is down curved to avoid a stationary web 36 to which one end of the spring 37 is connected, the other end of spring 37 being connected to a lug 38 on the push bar 30, spring 37 serving to return push bar 30, and lug 38 acting as a stop to limit the outward movement of the push bar. A lug 39 is formed on one side of the coin lever 35, and after a coin is inserted, and the push bar 30 is moved in, the coin is forced under the lug 39 and thus tilts up the coin lever 35 which in turn raises a locking device 40 shown in detail in Fig. 12.

The locking device 40 comprises a bail 41 pivoted at 42 and having rollers 43. An arm 44 extends from the bail 41 and has a lug 45 on one side which rests upon the end of the coin lever 35. The arm 44 also has a lug 46 with a curved lower face and a lug 47 spaced from the lug 46, and when the locking device 40 is in normal position the lugs 46 and 47 receive a head 48 formed on the upper end of bell crank lever 15. The slide 29 has two downwardly projecting ear 49 which support the pivots 42, and attached to the ears 49 are two coil springs 50 as clearly shown in Figs. 4 to 7. A plate 51 is supported from the top plate 28 by a post 52, and the end of plate 51 has a lug 53 to which is pivoted a rock plate 54, as clearly shown in detail in Fig. 11, the latter having a transverse notch 55 close to its pivot. A paper clamp 56 is pivoted at 57 to the inner side of the top plate 28 and has a rubber pad 58 which is adapted to be pressed against the underside of the directory strip 5 and hold the same against a rib 59 formed on the underside of the slide 29. A cam 60 is pivoted at 61 and has an abutment 62 against which the lug 47 is adapted to bear to rock the cam 60 forward against the paper clamp 56 to force the latter against the underside of the directory strip 5 and thus hold the strip against movement when the slide 29 is open. It also prevents a person from pulling more of the directory strip into the open space when the slide is open.

The parts normally stand as shown in Fig. 4, the slide 29 being closed, and when in this position the lug 45 stands against the end of the rock plate 54 and the slide 29 can not be opened. By inserting a coin and pressing in push bar 30, coin lever 35 is swung up into the position shown in Fig. 10, thus tilting the locking device and moving its lug 45 above the end of the rock plate 54. At the same time lug 46 is moved above the head 48 of lever 15, whereupon the springs 50 contract and pull the slide 29 open so that the message can be written on the directory strip. As the slide thus retracts, the locking device 40 travels back with it, its rollers 43 rolling on guides 63, until the lug 45 drops into the notch 55 in the rock plate 54, which thus locks the slide 29 in open position, the parts now being in the position shown in Fig. 5, the cam 60 pressing the paper holder 56 against the directory strip and holding the strip firmly in position while the message is being written. After the message has been written the patron pushes down the crank 21 which rocks the bell crank lever 15 from the position shown in Fig. 5 to the position shown in Fig. 6, thus moving up dog 16 so that it engages the next higher cross bar 13, and placing spring 23 under tension. As the bell crank lever 15 is thus operated its head 48 rides under the lower curved face of lug 46 and tilts the locking device slightly upward sufficient to move its lug 45 out of engagement with notch 55 in rock plate 54, as indicated in Fig. 6. The operator then releases the crank 21 whereupon spring 23 contracts and rocks the bell crank lever in the other direction, and the head 48 of the bell crank lever bears against the rear face of the lug 46 and pushes the locking device ahead of it, and the locking device in turn moves the slide 29 back into normal closed position, the parts then assuming the position shown in Fig. 4. During this return movement the lug 45 of the locking device rides over the upper face of the rock plate 54 and at the conclusion of the movement it drops back of the rear end of the rock plate 54 so that the slide 29 is locked when closed and can not be opened again except in the regular way by inserting a coin. During this closing movement the downward motion of strap 14 pulls down the dog 16 and actuates the carrier a distance equal to twice the movement of the slide 29, so that a message which has just been written, together with an advertising card immediately above the message, are both moved into view in the display box.

In the form of strip shown in Fig. 15 the directory portion of the strip is arranged at one side of the blank portion and the spaces between the directory cards are blank as that portion of the strip is hid from view between successive steps of movement of the strip. In Fig. 16 the advertising portion completely fills one half of the strip and in this form the lower edge of each advertisement is parallel with the lower edge of each message space so that when the message is exposed to view the whole advertisement also appears in view, while before the message is exposed the upper part of the advertisement is hid from view as well as its lower part. In all forms of the strip, the slide when open exposes a blank space only, while when the message is exposed the adjacent advertisement is also exposed.

What I claim is:—

1. In an information and directory cabinet, a box having an opening, a slide normally covering the opening, a directory strip, an endless carrier to which the directory strip is connected, mechanism for opening the slide, and crank means for operating the carrier and closing the slide.

2. In an information and directory cabinet, a box having an opening, a directory strip movable past the opening, a slide normally covering the opening, mechanism for operating the slide, and means operating automatically when the slide is open to grip the strip and prevent slipping thereof and to free the strip when the slide is moved from open position.

3. In an information and directory cabinet, a box having an opening, a directory strip movable past the opening, a slide normally closing the opening, a display box, an endless carrier in the display box to which the strip is connected, a lever, a dog operated by the lever to engage and actuate the carrier, spring means for moving the lever in one direction, a dash pot for cushioning that movement of the lever, and mechanism for operating the slide and controlling said lever.

4. In an information and directory cabinet, a box having an opening, a directory strip movable past the opening, a slide normally closing the opening, a display box, an endless carrier in the display box to which the strip is connected, a lever, a dog operated by the lever to engage and actuate the carrier, spring means for moving the lever in one direction, a dash pot for cushioning that movement of the lever, and mechanism for operating the slide and controlling said lever, spring means for opening the slide when released by the controlling mechanism, a crank for moving said lever into operative connection with the slide after the slide is open, the first mentioned spring means acting to then reverse the lever and thereby close the slide.

5. In an information and directory cabinet, a box having an opening, a directory strip movable past the opening, a slide normally closing the opening, a display box, an endless carrier in the display box to which the strip is connected, a lever, a dog operated by the lever to engage and actuate the carrier, spring means for moving the lever in one direction, and mechanism for operating the slide and controlling said lever.

6. In an information and directory cabinet, a box having an opening, a directory strip movable past the opening, a slide normally closing the opening, a locking device pivotally supported by the slide, a rock plate normally engaged by the locking device, a push bar, means operated by the push bar for lifting the locking device out of engagement with the rock plate, spring means for retracting the slide and locking device, the rock plate having a notch engaged by the locking device when the latter is retracted with the slide, a carrier for the strip, a dog engaging the carrier, a lever for operating the dog, said lever being locked by the locking device when the slide is closed.

7. In an information and directory cabinet, a box having an opening, a directory strip movable past the opening, a slide normally closing the opening, a locking device pivotally supported by the slide, a rock plate normally engaged by the locking device, a push bar, means operated by the push bar for lifting the locking device out of engagement with the rock plate, spring means for retracting the slide and locking device, the rock plate having a notch engaged by the locking device when the latter is retracted with the slide, a carrier for the strip, a dog engaging the carrier, a lever for operating the dog, said lever being locked by the locking device when the slide is closed, said lever operating when swung back to lift the locking device out of said notch, and spring means for returning the lever to push the locking device and slide back to closed position.

8. In an information and directory cabinet, a box having an opening, a directory strip movable past the opening, a slide normally closing the opening, a locking device pivotally supported by the slide, a rock plate normally engaged by the locking device, a push bar, means operated by the push bar for lifting the locking device out of engagement with the rock plate, spring means for retracting the slide and locking device, the rock plate having a notch engaged by the locking device when the latter is retracted with the slide, a carrier for the strip, a dog engaging the carrier, a lever for operating the dog, said lever being locked by the locking device when the slide is closed, a strap connected to said lever and pivotally supporting the dog, said carrier comprising two chains united at intervals by cross rods adapted to be engaged by the dog.

9. In an information and directory cabinet, a box having an opening, a directory strip movable past the opening, a slide normally closing the opening, a locking device pivotally supported by the slide, a rock plate normally engaged by the locking device, a push bar, means operated by the push bar for lifting the locking device out of engagement with the rock plate, spring means for retracting the slide and locking device, the rock plate having a notch engaged by the locking device when the latter is retracted with the slide, a carrier for the strip, a dog engaging the carrier, a lever for operating the dog, said lever being locked by the locking device when the slide is closed, a strap connected to said lever and pivotally supporting the dog, said carrier comprising two chains united at intervals by cross rods adapted to be engaged by the dog, a display box in which the carrier operates, said dog having a curled portion sliding along the wall of the display box.

In testimony whereof, I have hereunto set my hand at Los Angeles, California, this 25th day of March 1908.

ELIJAH A. OVENSHIRE.

In presence of—
GEORGE T. HACKLEY,
FRANK L. A. GRAHAM.